US012614744B2

(12) United States Patent
Yoon et al.

(10) Patent No.: US 12,614,744 B2
(45) Date of Patent: Apr. 28, 2026

(54) FUEL CELL SYSTEM OF MOBILITY AND METHOD FOR CONTROLLING THE SAME

(71) Applicants: Hyundai Motor Company, Seoul (KR); Kia Corporation, Seoul (KR)

(72) Inventors: Sang Hyun Yoon, Seoul (KR); Soon Oh Kwon, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 389 days.

(21) Appl. No.: 17/654,623

(22) Filed: Mar. 14, 2022

(65) Prior Publication Data
US 2022/0384827 A1 Dec. 1, 2022

(30) Foreign Application Priority Data
Jun. 1, 2021 (KR) .......................... 10-2021-0071059

(51) Int. Cl.
H01M 8/04537 (2016.01)
H01M 8/04223 (2016.01)
(Continued)

(52) U.S. Cl.
CPC ... H01M 8/04574 (2013.01); H01M 8/04223 (2013.01); H01M 8/04738 (2013.01); H01M 8/04895 (2013.01); *H01M 2250/20* (2013.01)

(58) Field of Classification Search
CPC .......... B60L 3/0038; B60L 7/18; B60L 58/30; B60L 58/40; B60Y 2400/302;
(Continued)

(56) References Cited

U.S. PATENT DOCUMENTS

2001/0055705 A1* 12/2001 Yagi .................. H01M 8/04223
429/413
2005/0026013 A1* 2/2005 Sakakida .......... H01M 8/04225
429/429
(Continued)

FOREIGN PATENT DOCUMENTS

EP       2084770 B1 * 12/2010  ........ H01M 8/04223
JP   2006092882 A  * 4/2006
(Continued)

OTHER PUBLICATIONS

JP2006092882A, Okuno, et al. "Fuel Cell System Capable of Effectively Using Power . . .", machine English translation retrieved from https://worldwide.espacenet.com/ Date: Jan. 6, 2026 (Year: 2006).*
(Continued)

*Primary Examiner* — Tiffany Legette
*Assistant Examiner* — Jared Hansen
(74) *Attorney, Agent, or Firm* — MCDONNELL BOEHNEN HULBERT & BERGHOFF LLP

(57) ABSTRACT
The present disclosure provides a fuel cell system of a mobility and a method for controlling a fuel cell including a control unit configured to control a remaining current of a fuel cell to be consumed by a plurality of accessories, to select an accessory that is a target to consume the remaining current among the plurality of accessories depending upon a temperature condition and a level of a consumable power of the accessory, and to set a priority of the selected accessories.

10 Claims, 4 Drawing Sheets

(51) Int. Cl.
H01M 8/04701 (2016.01)
H01M 8/04858 (2016.01)

(58) Field of Classification Search
CPC ............... H01M 8/043; H01M 8/0432; H01M 8/04223; H01M 8/04302; H01M 8/04373; H01M 8/04574; H01M 8/04664; H01M 8/04738; H01M 8/04895; H01M 8/04947; H01M 2250/20; Y02E 60/50
See application file for complete search history.

(56) References Cited

U.S. PATENT DOCUMENTS

| | | | | |
|---|---|---|---|---|
| 2006/0046895 | A1* | 3/2006 | Thacher | H01M 8/04365 |
| | | | | 477/4 |
| 2009/0035616 | A1* | 2/2009 | Darling | H01M 8/0258 |
| | | | | 429/429 |
| 2011/0065012 | A1* | 3/2011 | Kwon | H01M 16/006 |
| | | | | 429/429 |
| 2012/0308906 | A1* | 12/2012 | Paganelli | H01M 8/04671 |
| | | | | 429/429 |
| 2018/0375135 | A1* | 12/2018 | Kumada | H01M 8/04201 |
| 2020/0220184 | A1* | 7/2020 | Shimada | B60L 50/75 |
| 2020/0381935 | A1* | 12/2020 | Shimada | H01M 10/486 |
| 2022/0106060 | A1* | 4/2022 | Morrison | H01M 8/0438 |

FOREIGN PATENT DOCUMENTS

| | | | | | |
|---|---|---|---|---|---|
| JP | 2006185907 | A | * | 7/2006 | H01M 8/04619 |
| KR | 100911562 | B1 | | 8/2009 | |
| KR | 101350187 | B1 | * | 1/2014 | H01M 8/04992 |

OTHER PUBLICATIONS

JP2006185907A, Okamoto, et al. "Fuel Cell System", machine English translation retrieved from https://worldwide.espacenet.com/ Date: Jan. 6, 2026 (Year: 2006).*

KR101350187B1, Jeon, et al. "Control method for cold start pre-conditioning of fuel cell system", machine English translation retrieved from https://worldwide.espacenet.com/ Date: Jan. 6, 2026 (Year: 2014).*

* cited by examiner

FUEL CELL SYSTEM OF MOBILITY AND METHOD FOR CONTROLLING THE SAME

CROSS-REFERENCE TO RELAYED APPLICATIONS

The present application claims priority to Korean Patent Application No. 10-2021-0071059 filed on Jun. 1, 2021, the entire contents of which is incorporated herein for all purposes by this reference.

TECHNICAL FIELD

The present disclosure relates to a fuel cell system of a mobility and a method for controlling the same, and more specifically, to a fuel cell system of a mobility and a method for controlling the same, which control a remaining current of a fuel cell, which does not flow into a battery after the fuel cell is shut down or before it is restarted, to be consumed by a plurality of accessories, thereby preventing performance deterioration and durability deterioration of the fuel cell due to an overcurrent, and set the selection and priority of the accessories depending upon a state of the mobility previously driven, thereby blocking the side effects due to a pre-operation of the accessory.

BACKGROUND

A mobility configured to generate driving outputs through a fuel cell and a battery may be provided with a high-voltage battery, and therefore, provided with a high-voltage power converter (e.g., a bi-direction high-voltage DC-DC converter (BHDC) or a fuel cell DC-DC converter (FDC)) to match levels between the high-voltage battery and voltage terminals of a fuel cell side. However, the high-voltage power converter is shut down for protecting high-voltage components due to the property of the component if there occurs an error frame (shut-down (S/D) mode). The stopped high-voltage power converter reoperates only through a restarting sequence after key-off. In particular, if there occurs the error frame in the high-voltage power converter while a hydrogen electric vehicle is operated, the high-voltage power converter stops operating and enters the shut-down sequence.

At this time, if a fine current flows outside, a high potential is formed, and at the same time, the fine current may not flow into a high-voltage battery terminal due to the non-operation of the high-voltage power converter according to the occurrence of the error frame. This may increase levels of the voltage terminals of the fuel cell system, and cause cumulative damage to the fuel cell system. Therefore, this case may also be solved in a hardware method, such as manually driving the fuel cell or balance of plants (BOP) of the fuel cell side, but there is a need for a software solution method for automatically consuming the fine current in advance.

The foregoing explained as the background of the fuel cell system of the mobility and the method for controlling the same is intended merely to aid in the understanding of the background of the present disclosure, and is not intended to mean that the present disclosure falls within the purview of the related art that is already known to those skilled in the art.

SUMMARY

The present disclosure has been made in an effort to solve the above problems associated with the related art, and an object of the present disclosure is to provide a fuel cell system of a mobility and a method for controlling the same, which control a remaining current of a fuel cell, which does not flow into a battery after the fuel cell is shut down or before it is restarted, to be consumed by a plurality of accessories, thereby preventing performance deterioration and durability deterioration of the fuel cell due to an overcurrent, and set the selection and priority of the accessories depending upon a state of a mobility previously driven, thereby blocking the side effects due to a pre-operation of the accessory.

A fuel cell system of a mobility according to the present disclosure includes a control unit configured to control a remaining current of a fuel cell to be consumed by a plurality of accessories, to select an accessory that is a target to consume the remaining current among the plurality of accessories depending upon a temperature condition and a level of a consumable power of the accessory, and to set a current consumption priority of the selected accessories.

The control unit may select a cold starting accessory to consume the remaining current among the plurality of accessories if a mobility satisfies a cold starting condition, and select a normal starting accessory if the mobility satisfies a normal starting condition.

The control unit may determine the cold starting condition or the normal starting condition through an outside temperature of the mobility or a temperature of the accessory.

The control unit may determine the cold starting condition or the normal starting condition depending upon whether each temperature sensor of the cold starting accessary or the normal starting accessory is in an abnormal operation state or in a failure state.

In setting the current consumption priority of the selected accessories, the control unit may set a priority to an accessory whose consumable power is equal to or higher than a consumed current for consuming the remaining current of the fuel cell among the selected accessories.

The control unit may set a priority to a heating device among the selected accessories when selecting the cold starting accessory, and set the priority to a cooling device among the selected accessories when selecting the normal starting accessory.

The control unit may set the priority to an accessory with a subsequent lower priority if a temperature sensor of the accessory to which the priority is set is in an abnormal operation state or in a failure state.

The control unit may select an accessory whose consumable power is equal to or higher than a consumed power for the remaining current of the fuel cell among the plurality of accessories.

In setting the current consumption priority of the selected accessories, the control unit may set the priority to a heating device or a cooling device through an outside temperature of the mobility or a temperature of the accessory among the selected accessories.

In setting the current consumption priority of the selected accessories, the control unit may set the priority to the accessory depending upon whether each temperature sensor of the accessory among the selected accessories is in an abnormal operation state or in a failure state.

The control unit may control the function to stop if the accessory to which the priority is set may perform a regenerative braking of a motor.

A method for controlling a fuel cell of a mobility according to the present disclosure, as the method for controlling a remaining current of a fuel cell to be consumed by a plurality of accessories, includes receiving, by a control unit, a temperature condition and a consumable power of an accessory; selecting, by a control unit, an accessory that is a target to consume the remaining current among the plurality of accessories depending upon the received temperature condition and a level of the received consumable power of the accessory; and setting, by a control unit, a current consumption priority of the selected accessories depending upon the received temperature condition and the level of the received consumable power of the accessory.

The selecting of the accessory may select a cold starting accessory among the plurality of accessories if a mobility satisfies a cold starting condition, and select a normal starting accessory if the mobility satisfies a normal starting condition.

The selecting of the accessory may select an accessory whose consumable power is equal to or higher than a consumed power for consuming the remaining current of the fuel cell among the plurality of accessories.

The setting of the current consumption priority of the accessories may control the function to stop if the accessory to which the priority is set performs a regenerative braking of a motor.

The fuel cell system of the mobility and the method for controlling the same according to the present disclosure control the remaining current of the fuel cell, which does not flow into a battery after the fuel cell is shut down or before it is restarted, to be consumed by the plurality of accessories, thereby preventing performance deterioration and durability deterioration of the fuel cell due to the overcurrent, and set the selection and priority of the accessories depending upon the state of the mobility previously driven, thereby blocking the side effects due to the pre-operation of the accessory.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Specific structural or functional descriptions specified to exemplary embodiments of the present disclosure disclosed in the present specification or application are only exemplified for the purpose of describing the exemplary embodiments according to the present disclosure, and the exemplary embodiments according to the present disclosure may be carried out in various forms and should not be interpreted as being limited to the exemplary embodiments described in the present specification or application. Hereinafter, the exemplary embodiment of the present disclosure will be described in detail with reference to the accompanying drawings.

Figure 1:
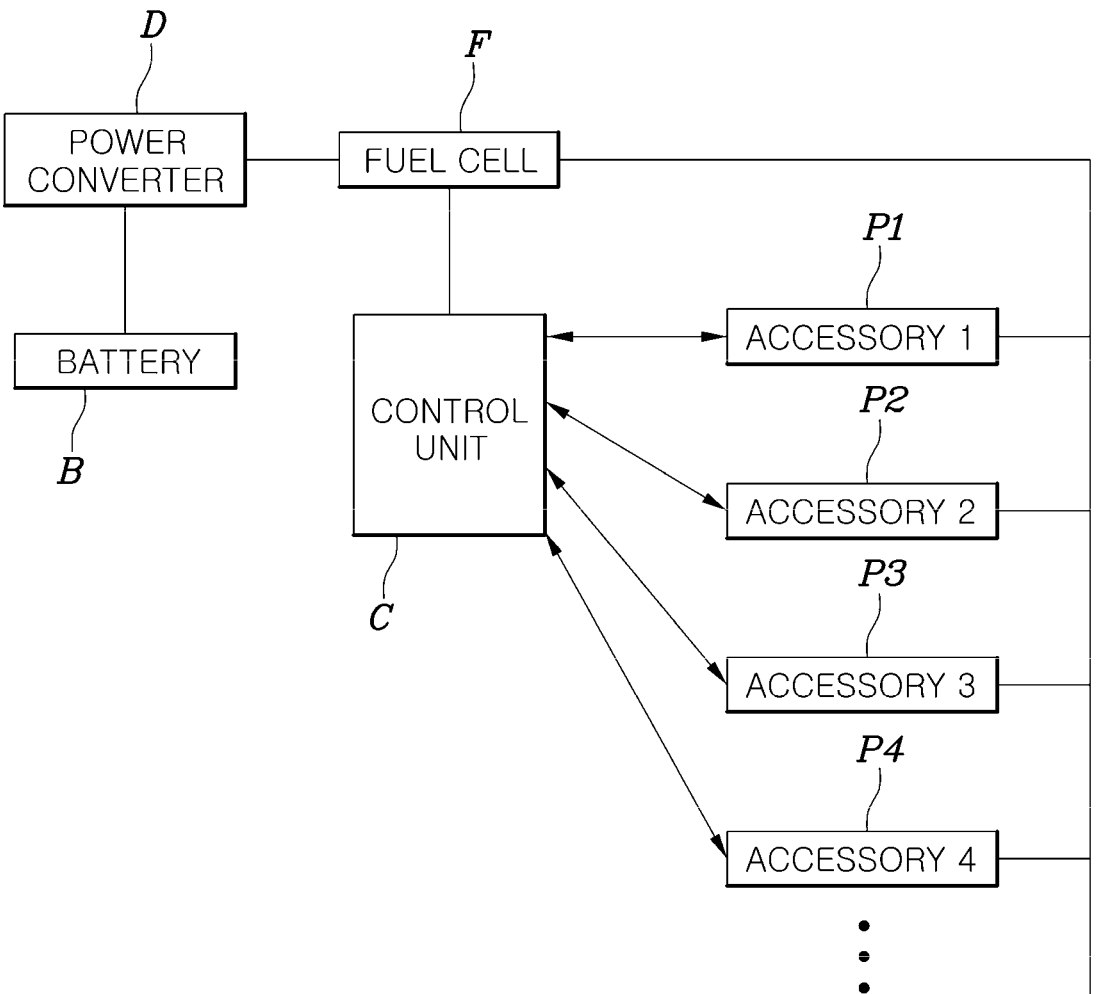
FIG. 1 is a configuration diagram of a fuel cell system of a mobility according to an exemplary embodiment of the present disclosure.
Figure 2:
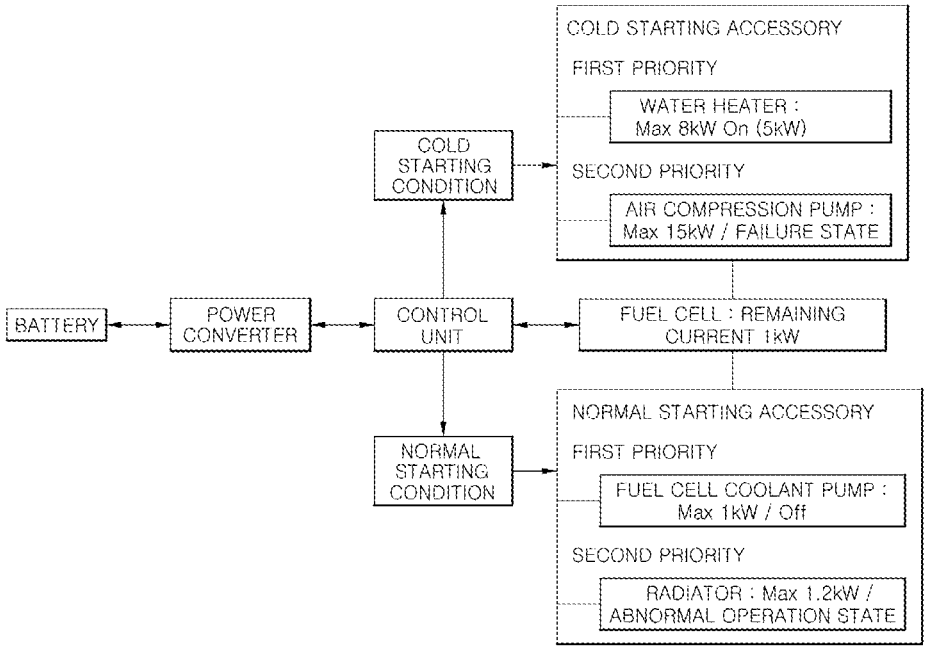
FIG. 2 is a diagram according to an application of the fuel cell system of the mobility according to the exemplary embodiment of the present disclosure.
Figure 3:
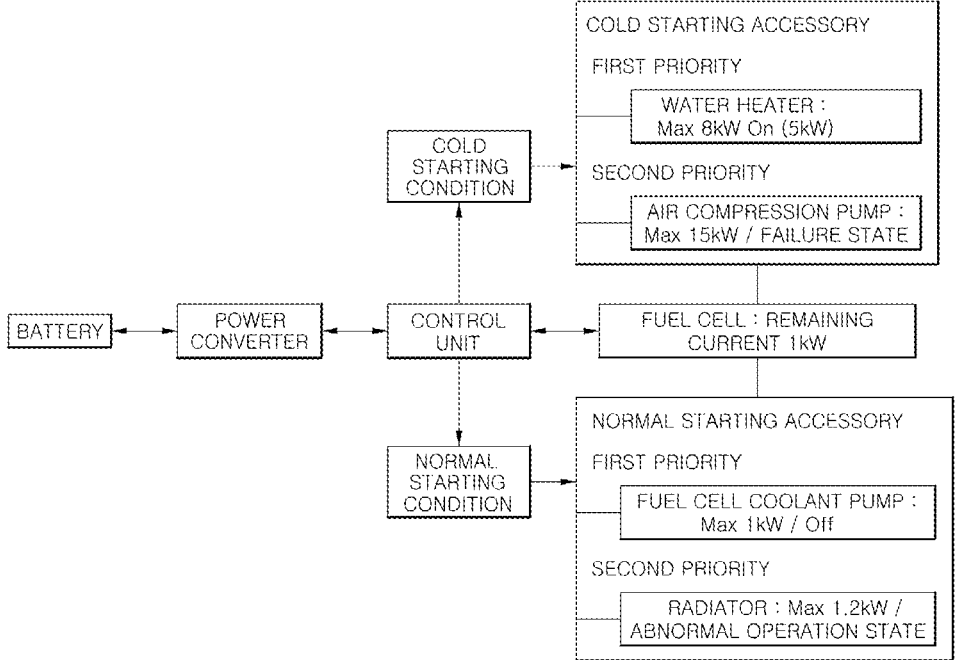
FIG. 3 is a diagram according to another application of the fuel cell system of the mobility according to the exemplary embodiment of the present disclosure.
Figure 4:
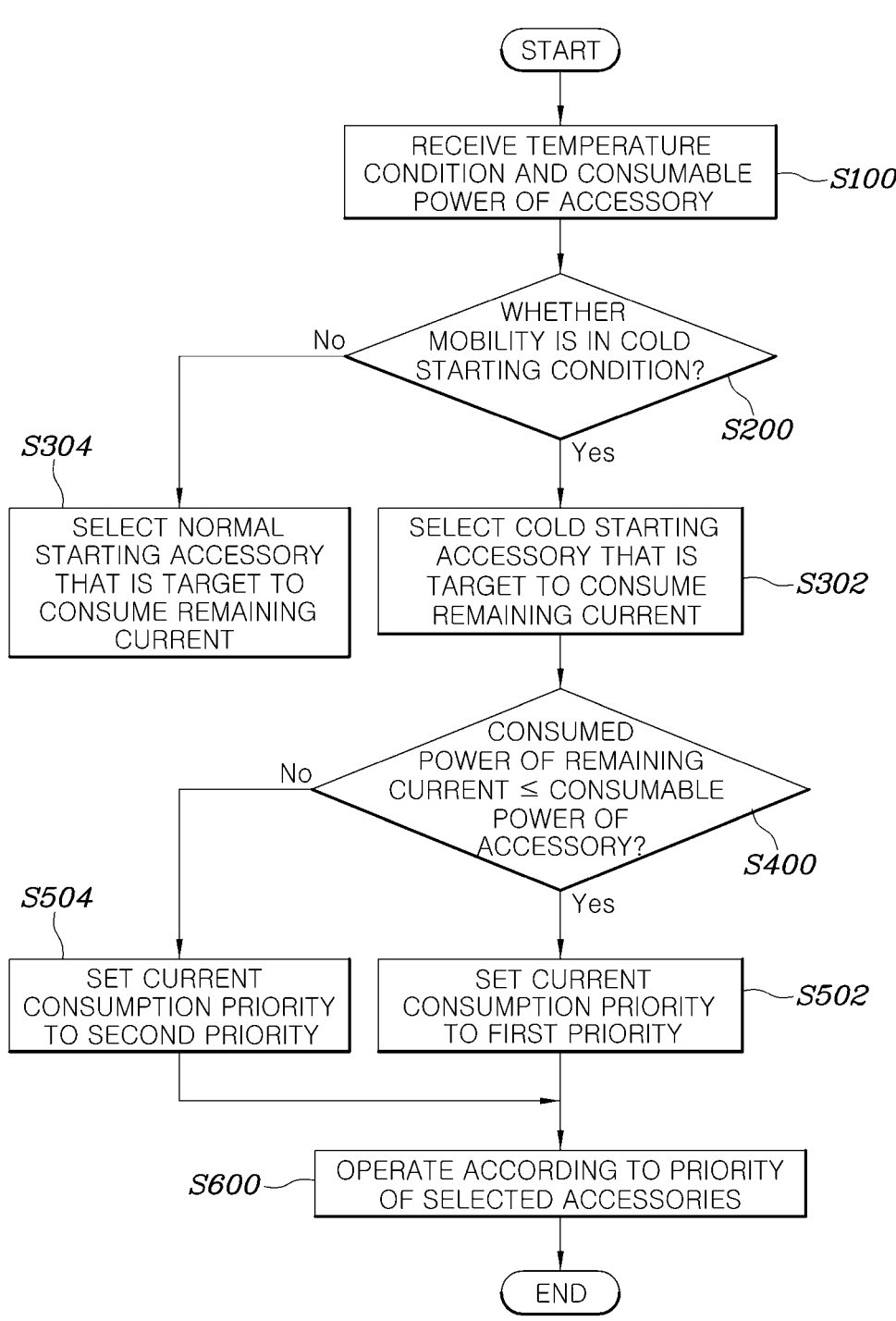
FIG. 4 is a flowchart illustrating a method for controlling the fuel cell system of the mobility according to the exemplary embodiment of the present disclosure.

FIG. 1 is a configuration diagram of a fuel cell system of a mobility according to an exemplary embodiment of the present disclosure, FIG. 2 is a diagram according to an application of the fuel cell system of the mobility according to the exemplary embodiment of the present disclosure, FIG. 3 is a diagram according to another application of the fuel cell system of the mobility according to the exemplary embodiment of the present disclosure, and FIG. 4 is a flowchart illustrating a method for controlling the fuel cell system of the mobility according to the exemplary embodiment of the present disclosure.

FIG. 1 is a configuration diagram of a fuel cell system of a mobility according to an exemplary embodiment of the present disclosure, in which a fuel cell system of a mobility illustrated in FIG. 1 includes a control unit C configured to control a remaining current of a fuel cell to be consumed by a plurality of accessories, to select an accessory that is a target to consume the remaining current among the plurality of accessories depending upon a temperature condition and a level of a consumable power of the accessory, and to set a current consumption priority of the selected accessories.

The fuel cell system of the mobility illustrated in FIG. 1 includes a system configured to generate a driving force through a fuel cell F and a battery B. The battery B may include a large capacity battery. In this case, the fuel cell F matches voltage levels between the energy generated by hydrogen-oxygen reaction and the battery B through a power converter D to store the matched voltage levels. However, if the power converter D is controlled as an error frame due to a vehicle collision or the like to be shutdown, the power converter D is temporarily shut down (shut-down (S/D) mode) in order to protect remaining devices. However, the remaining current generated by the fuel cell F that has been driven may not flow into the battery B by the power converter D and remains in the fuel cell F to continuously cause damage, such as erosion, to the respective stacks and cells due to a voltage biased on an end cell. Therefore, in this case, a main principle of an exemplary embodiment of the present disclosure is that each of or some of two or more accessories P1, P2, P3, P4 connected to voltage terminals of the fuel cell F side are driven to consume the remaining current of the fuel cell F, thereby preventing performance deterioration and durability deterioration of the fuel cell due to the remaining current.

At this time, to determine the temperature condition, the control unit C illustrated in FIG. 1 receives information about a temperature of the accessory or the outside temperature (e.g., humidity or whether heating/cooling devices or a temperature measurement device is in a failure or abnormal operation state) from the plurality of accessories P1, P2, P3, P4 or a temperature sensor installed outside the accessory. Further, the control unit C receives information about a consumed power necessary for removing the remaining current of the fuel cell and a consumable power of the accessory through the plurality of accessories P1, P2, P3, P4 and the voltage terminals of the fuel cell F connected thereto. Here, the consumable power of the accessory may be calculated as a value obtained by subtracting an output currently consumed by the corresponding accessory from the maximum consumable power of the corresponding accessory. However, the consumable power may be calculated as 0 if the corresponding accessory is in a failure state or in an abnormal operation state. Further, the consumable/consumed "power" is a power at the current time (i.e., instantaneous power) or an average consumable power over time, or an ON power, and is a concept including a duty or the like in the relationship with an OFF section.

Therefore, the control unit C illustrated in FIG. 1 selects the accessory (e.g., P1 or P2) that is a target to consume the remaining current among the plurality of accessories P1, P2, P3, P4. Then, the control unit C sets the priority of the accessories selected based on the above information (e.g., P1 refers to a first priority and P2 refers to a second priority). FIG. 1 illustrates an interface between the control unit C and the plurality of accessories P1, P2, P3, P4 with bi-directional arrows.

If the mobility driven by the fuel cell F and the battery B maintains a steady state with the outside temperature for a long time before starting, the related art that controls the remaining current of the fuel cell F to be consumed by the plurality of accessories P1, P2, P3, P4 may contribute to preventing performance and durability deteriorations of the fuel cell. However, if the mobility may not be driven enough to consume the remaining current because each or several of the plurality of accessories P1, P2, P3, P4 are already driven as much as possible before a restart mode, the remaining current of the fuel cell F may not be removed by the corresponding accessory. Alternatively, if the mobility is exposed to a temperature lower than a normal temperature or any accessory is out of control with respect to the temperature even before the restart mode or during operation, an excessive operation for removing the remaining current of the fuel cell F is also accompanied by a risk, such as failure or an abnormal operation of the accessory, or the out-of-control driving of the fuel cell and the battery due to the failure or abnormal operation of the accessory.

Therefore, the exemplary embodiment of the present disclosure solves the problem, which is caused by selecting and driving any one accessory or several accessories, by selecting the accessory to consume the remaining current depending upon the temperature condition and the level of the consumable power of the accessory. In other words, according to the exemplary embodiment of the present disclosure, it is possible to control the selection of the accessory depending upon the state of the mobility, thereby removing the remaining current of the fuel cell and at the same time, implementing the state of the mobility capable of entering the (re)start mode and maintaining the operation. As a result, this increases stability of the fuel cell control.

Furthermore, according to the exemplary embodiment of the present disclosure, the power consumption priority of the selected accessories is set. This does not just select the appropriate accessories, but rather completes the goal of consuming the remaining current of the fuel cell. In other words, the control unit according to the present exemplary embodiment controls the accessory with the same priority or the subsequent lower priority to all consume the remaining current of the fuel cell if the remaining current of the fuel cell is not all consumed even after the accessory with the first priority is driven.

At the same time, according to the present exemplary embodiment, the criteria of setting the priority of the accessory are ?the current consumption, thereby controlling it to set the priority to a device for removing an element interfering with the current consumption. For example, if the accessory performs a regenerative braking function of a motor when a rotation speed (RPM) of the accessory is decreased among the accessories (hereinafter, an accessory with a higher priority is referred to as P1 and an accessory with a lower priority is referred to as P2), the remaining current of the fuel cell F consumed by the operation of the accessory P2 may be revived by the regenerative braking function. In this case, it is possible to set the priority to the accessory P1 that controls the function, thereby blocking the element interfering with the consumption of the remaining current.

Therefore, according to the exemplary embodiment of the present disclosure, it is possible to select the accessory depending upon the temperature condition and the level of the consumable power of the accessory and at the same time, to set the current consumption priority, thereby consuming the remaining current of the fuel cell without failure or abnormality of the fuel cell system. Therefore, according to the exemplary embodiment of the present disclosure, it is possible to prevent the performance and durability deteriorations of all devices including the accessory and a battery constituting the mobility due to an erroneous starting or the like as well as preventing the performance and durability deteriorations of the fuel cell, and to increase stability of the device control.

Here, the accessories P1, P2, P3, P4 are targets that are connected to the voltage terminals of the fuel cell side to consume the remaining current of the fuel cell. Specifically, the accessory includes an accessory necessary for starting the mobility under a cold starting condition or a normal starting condition. Such an accessory includes ① a heating or cooling device for increasing or decreasing the temperatures of the fuel cell and BOP of the fuel cell side, such as a heater or an air-cooled cooling fan installed on the pole inlet of the fuel cell and an auxiliary device thereof, or a water-cooled coolant pump and an auxiliary device thereof, ② a measurement device of the temperature, ③ a warning device according to failure or an abnormal operation thereof, and further, ④ a device for controlling coolant not to be circulated, or a control device for controlling a cathode oxygen depletion (COD) heater or the like with forced coolant circulation to be turned off, and ⑤ a device for starting the reaction of the fuel cell of the mobility, such as an air blower or hydrogen recirculation blower for the fuel cell, under the corresponding temperature condition, a device for discharging (purging) or drying water generated by the reaction of the fuel cell, or a humidifier for replenishing the moisture necessary for starting the fuel cell stack, which is deficient due to purging or drying.

FIG. 2 is a diagram according to the application of the fuel cell system of the mobility according to the exemplary embodiment of the present disclosure, in which the control unit may select a cold starting accessory to consume the remaining current among the plurality of accessories if the mobility satisfies the cold starting condition, and select a normal starting accessory if the mobility satisfies the normal starting condition. In other words, the control unit may select the accessory suitable for the state of the mobility.

Here, the cold starting condition of the mobility provided with the fuel cell is a condition determined according to the temperature condition. Here, the temperature condition means conditioning the state where the devices are changed depending upon the temperature of the mobility or those of the devices constituting the mobility. As an example, the temperature condition may be a setup indicating whether the outside temperature of a specific accessory or the mobility is equal to or higher than a certain level or lower than the certain level, or in a range of an allowable temperature of the specific accessory or the mobility. Further, here, the temperature condition includes a dry or condensation state of moisture as a change in humidity of the mobility or the devices constituting the mobility due to high temperature/low temperature. Further, here, the temperature condition may be evaluated depending upon whether the temperature measurement device of the specific accessory or the mobility is in the failure state or in the abnormal operation state. Then, here, the temperature condition may be evaluated depending upon whether the fuel cell/battery for driving the mobility or the heating/cooling devices for increasing or decreasing the temperature of the mobility is in the failure state or in the abnormal operation state. Here, the temperature measurement device includes a contact-type temperature measurement device through conduction and convection phenomena, such as thermocouple, and a contactless-type temperature measurement device through radiation, such as an infrared thermometer. Lastly, here, the temperature condition may be evaluated depending upon whether the device for warning overheating or overcooling of the mobility, the fuel cell, the battery, or the accessory is in the operation state.

Therefore, here, the cold starting condition of the mobility means a state where the mobility may start to operate in the state where the temperature condition is in a cold state. In other words, the cold starting condition means a state where the mobility may start to operate under the temperature condition evaluated depending upon ① whether the outside temperature of the specific accessory(s) or the mobility is lower than a certain level, ② whether the temperature condition is out of the range of the allowable temperature of the specific accessory(s) or the mobility, ③ whether the degree of condensation or cooling of moisture within the mobility (or devices constituting the mobility) is out of a certain level or a certain scope, ④ whether the temperature measurement device, the battery and the fuel cell, the heating/cooling devices and/or the warning device thereof are in the failure state or in the abnormal operation state, or others. Conversely, here, the normal starting condition of the mobility means a state where the mobility may start to operate in a state where the temperature condition is not in the cold state.

Further, here, the cold starting accessory includes an accessory necessary for starting the mobility under the cold starting condition. This does not just mean only a separate heater installed on the pole inlet of the fuel cell, but rather includes a heating device for increasing the temperatures of the fuel cell and the BOP of the fuel cell side, such as a heater for heating coolant or a heater for simultaneously heating coolant and hydrogen by connecting a coolant pipe to a hydrogen pipe of the fuel cell and the temperature measurement device thereof, the warning device, or the like. Further, here, the cold starting accessory includes a device for controlling coolant not to be circulated, or a control device for controlling the cathode oxygen depletion (COD) heater with forced coolant circulation to be turned off, as a strategy of securing the cold starting ability. Then, the cold starting accessory includes a starting device (e.g., the air blower or hydrogen recirculation blower for the fuel cell) of the fuel cell of the mobility under the corresponding temperature condition. Further, the cold starting accessory includes the device for discharging (purging) or drying the water generated by the reaction of the fuel cell. Meanwhile, the cold starting accessory includes the humidifier for replenishing moisture necessary for starting the fuel cell stack, which is deficient due to pursing or drying.

Meanwhile, here, the normal starting accessory includes an accessory necessary for the mobility to start under the normal starting condition of the mobility. Therefore, the normal starting accessory includes the fuel cell or the battery, the cooling device for decreasing the temperatures of the accessories, the temperature measurement device thereof, the warning device and the control device thereof, or the like. The cooling device includes the water-cooled cooling fan and the auxiliary device thereof, and the water-cooled coolant pump and the auxiliary device thereof. The auxiliary device includes a cooling fin for increasing a contact area with air, a shroud for evenly cooling each component, a valve for adjusting the flow of coolant, a radiator for cooling the coolant, a cooling fan for helping ventilation of the radiator, a coolant auxiliary tank for preventing loss of the coolant by absorbing expansion of the coolant, a radiator cap for increasing a boiling point of the coolant, a water temperature sensor, a thermostat (coolant switchgear), a coolant circulator, or the like. Lastly, the normal starting accessory includes the air blower or hydrogen recirculation blower for the fuel cell as the starting device of the fuel cell of the mobility under the corresponding temperature condition.

First, FIG. 2 illustrates a control method of the control unit for selecting the cold starting accessory or the normal starting accessory depending upon the cold starting condition or normal starting condition of the mobility. The power converter illustrated in FIG. 2 originally serves to charge the energy of the fuel cell in the battery by increasing the voltage. In this case, the remaining current of the fuel cell may be consumed by the power converter and the battery thereof. However, in another case, it is assumed that here, the power converter is out of control due to an error frame signal while the fuel cell is driven. In this case, the power converter may not store an overvoltage generated by the remaining hydrogen-oxygen of the fuel cell side in the battery.

At this time, the control unit according to the exemplary embodiment of the present disclosure selects the cold starting accessory or the normal starting accessory depending upon the cold starting condition or the normal starting condition of the mobility. As an example, the cold starting accessory indicates a water heater for heating the coolant of the fuel cell side and an air compressor for removing remaining generated water within the fuel cell and starting the mobility or driving the fuel cell in FIG. 2 among the accessories necessary for the cold starting. Further, the normal starting accessory indicates a coolant pump for circulating the coolant of the fuel cell side and a radiator for dissipating the coolant in FIG. 2 among the accessories necessary for the normal starting. Here, one of a group of the accessories is selected depending upon each condition.

Then, FIG. 2 illustrates the control method of the control unit for setting the current consumption priority depending upon the temperature condition and the level of the consumable power of the accessory among the selected cold starting accessories. As illustrated in FIG. 2, according to the present exemplary embodiment, the priority may be set depending upon whether the heating device is in the failure state or in the abnormal operation state among the temperature conditions. FIG. 2 illustrates that among the cold starting accessories, the water heater is set as the first priority as the heating device, and the air compression pump is set as the second priority. Further, FIG. 2 illustrates that based on the criteria of setting the priority, the control unit according to the exemplary embodiment sets the priority to the water heater ① as the accessory that is not in the failure state, or ② as the accessory whose consumable power is equal to or higher than the power (x kW, hereinafter the same) to consume the remaining current of the fuel cell. Here, the consumable power of the accessory is $_pMax-_pOn$, that is, a value obtained by subtracting the output currently consumed by the accessory from the maximum consumable power. For example, the consumable power of the water heater of the cold starting accessory selected depending upon the cold starting condition illustrated in FIG. 2 is a-b(>x), and the consumable power of the coolant pump of the fuel cell of the normal starting accessory selected depending upon the normal starting condition may be derived as d-0. Meanwhile, if the accessory is in the failure state or in the abnormal operation state, the consumable power of the accessory may be derived as 0. Therefore, an air compression pump of the cold starting accessory selected depending upon the cold starting condition illustrated in FIG. 2, and the radiator of the normal starting accessory selected depending upon the normal starting condition may be derived as 0 in spite of having the maximum consumable power (c, e from the left).

Likewise, FIG. 2 illustrates the control method of the control unit for setting the current consumption priority depending upon the temperature condition and the level of the consumable power of the accessory among the selected normal starting accessories. As illustrated in FIG. 2, according to the present exemplary embodiment, the priority may be set depending upon whether the cooling device is in the failure state or in the abnormal operation state among the temperature conditions. FIG. 2 illustrates that among the normal starting accessories, the coolant pump of the fuel cell is set as the first priority as the cooling device, and the radiator is set as the second priority. Further, FIG. 2 illustrates that the control unit according to the exemplary embodiment sets the priority to the coolant pump (d>x) of the fuel cell as the accessory that is not in the abnormal operation state, or as the accessory whose consumable power is equal to or higher than the power (x kW) to consume the remaining current of the fuel cell.

As in the example illustrated in FIG. 2, according to the exemplary embodiment of the present disclosure, it is possible to remove the remaining current of the fuel cell and secure the cold starting ability of the mobility provided with the fuel cell at the same time. For example, assuming a case where the temperature of the coolant of the fuel cell side is rapidly decreased, in this case, the mobility may not even start later even if the remaining current of the fuel cell is removed unless the temperature is increased in advance before starting through the accessory. Further, if the mobility is erroneously driven, there occurs a risky phenomenon in which the remaining water generated by the reaction of the fuel cell is frozen, thereby clogging the pipe. Therefore, according to the exemplary embodiment of the present disclosure of in FIG. 2, if the mobility is in the cold starting condition, the control unit controls the remaining current of the fuel cell to be removed and the mobility to be restarted through the accessory in an intact state by operating the accessory necessary for the cold starting in advance before starting or shutdown of the accessory.

FIG. 2 is a diagram according to the application of the fuel cell system of the mobility according to the exemplary embodiment of the present disclosure, and specifically, the control unit may determine the cold starting condition or the normal starting condition through the outside temperature of the mobility or the temperature of the accessory. In other words, according to the present exemplary embodiment, the selection criteria of the accessory is limited to the setup/scope of the temperature of the mobility or the accessory. More specifically, the control unit may determine the cold starting condition or the normal starting condition depending upon whether each temperature sensor of the cold starting accessory or the normal starting accessory is in the abnormal operation state or in the failure state.

The temperature condition may also be complicated depending upon the number and the relationship of devices constituting the mobility. In particular, the respective variables used for evaluating the temperature condition may be dependent and simplified, but may also be independent. In case of being independent, when the control unit determines whether the mobility satisfies the cold starting condition or the normal starting condition, there may occur an overload or a time delay. As the present exemplary embodiment, the outside temperature of the mobility and the temperature of the accessory are one variable of the temperature conditions of the outside temperature of the mobility or the devices for cooling/heating the fuel cell or the like through the accessory. For example, the outside temperature of the mobility is one of the temperature conditions measured by a heat dissipator, such as the cooling fan or the radiator that is the cooling device, and the temperature of the cooling device through the accessory is one of the temperature conditions measured by the coolant pump. Therefore, according to the exemplary embodiment of the present disclosure, it is possible to limit the condition to two cases, thereby increasing the calculation speed of the control unit, thereby securing the starting ability of the mobility. Further, two conditions may be easily measured by the temperature measurement device, and a specific temperature measurement device may be electronically driven by a microprocessor or the like, thereby enabling the enterprise source management of the accessories for removing the remaining current of the fuel cell.

Further, according to another exemplary embodiment of the present disclosure, it is evaluated whether the mobility is in the cold starting condition depending upon whether each temperature sensor is in the abnormal operation state or in the failure state. This is also one of the temperature conditions of the temperature measurement devices, and it is possible to limit the condition, thereby increasing the calculation speed of the control unit, and securing the starting ability of the mobility. Meanwhile, the failure state mentioned according to the exemplary embodiment of the present disclosure means a state of being unable to measure the temperature without displaying the On/Off of the temperature measurement device even if a power source is supplied to the temperature measurement device, and the abnormal operation state means a state where the temperature is measured but erroneously measured or where a range of the measurement error, or fluctuation, the setup or the setting section of the measurement value is out of a controlled scope of the normal temperature measurement. Therefore, according to another exemplary embodiment of the present disclosure that selects the accessory through the condition that is difficult to confirm the real situation of the mobility, such as the failure state or the abnormal operation state, it is possible to remove the element that would be a burden to remove the remaining current of the fuel cell in advance, thereby securing the starting ability and stability of the control of the mobility.

FIG. 2 is a diagram according to the application of the fuel cell system of the mobility according to the exemplary embodiment of the present disclosure, and specifically, in setting the current consumption priority of the selected accessories, the control unit may set the priority to the accessory whose consumable power is equal to or higher than the consumed power for consuming the remaining current of the fuel cell among the selected accessories. In other words, according to the present exemplary embodiment, it is possible to first control the device capable of consuming more remaining current of the fuel cell.

Here, the setting of the current consumption priority includes setting the rank of the operation order as the first priority and the second priority in the order from the high consumable power, setting the rank as the same priority if the consumable power is equal to or higher than the consumed power for consuming the remaining current of the fuel cell and setting the lower priority to the remaining accessories, or setting the rank in the order from the high consumable power of the remaining accessories. Here, the accessory with the same priority may be arbitrarily selected and driven. Further, the consumed power for consuming the remaining current of the fuel cell may be derived by experimentally measuring and comparing the current/voltage states in the normal state of the fuel cell, and an overcurrent, open circuit voltage (OCV), or overvoltage state.

Further, the consumable power of the accessory may be a value obtained by experimentally measuring and subtracting the output operated by the accessory from the maximum output that may be really generated depending upon whether the accessory is in the failure state or the like. Lastly, if there is no accessory whose consumable power is equal to or higher than the consumed power for consuming the remaining current of the fuel cell among the selected accessories, the priority may be set by aligning the accessories in the order from the high consumable power and then classifying the accessories into accessories that are equal to or higher than a first reference power and accessories that are lower than the first reference power. Alternatively, the priority may be set by classifying the accessories into the accessors that are equal to or higher than a certain rate of the consumed power for removing the remaining current among the selected accessories or the accessories that are lower than the certain rate. The rate may be 40% to 60%.

The control unit according to the aforementioned exemplary embodiment sets the priority based on the consumable power thereof among the selected cold starting accessory or normal starting accessory. Therefore, according to the aforementioned exemplary embodiment, it is possible to set the rank to the accessories capable of quickly removing the remaining current of the fuel cell among the selected accessories in consideration of the state of the mobility, thereby increasing promptness of the control. Further, according to the aforementioned exemplary embodiment, it is possible to set the rank to the accessory other than selecting one of the accessories again, thereby securing certainty of the control.

FIG. 2 is a diagram according to the application of the fuel cell system of the mobility according to the exemplary embodiment of the present disclosure, and more specifically, the control unit may set the priority to the heating device among the selected accessories when selecting the cold starting accessory, and set the priority to the cooling device among the selected accessories when selecting the normal starting accessory. As another exemplary embodiment, the control unit may set the priority to the accessory with the subsequent lower priority if the temperature sensor of the accessory to which the priority is set is in the abnormal operation state or in the failure state. In other words, according to the present exemplary embodiment, the priority may be set depending upon the functions of the heating/cooling devices and the measurement devices thereof.

Here, the heating device is a device for increasing the temperatures of the fuel cell, the BOP of the fuel cell side, and the like, and includes the separate heater installed on the pole inlet of the fuel cell, the heater for heating coolant, the heater for simultaneously heating coolant and hydrogen by connecting the coolant pipe to the hydrogen pipe of the fuel cell, or the like.

Here, the cooling device includes the air-cooled cooling fan and the auxiliary device thereof, and the water-cooled coolant pump and the auxiliary device thereof. The auxiliary device includes the cooling fin for increasing the contact area with the air, the shroud for evenly cooling each component, the valve for adjusting the flow of the coolant, the radiator for cooling the coolant, the cooling fan for helping the ventilation of the radiator, the coolant auxiliary tank for preventing damage to the coolant by absorbing expansion of the coolant, the radiator cap for increasing the boiling point of the coolant, the water temperature sensor, the thermostat (coolant switchgear), or the like.

According to the present exemplary embodiment, the priority is set to a temperature adjustment device as a device for securing the cold starting ability or the normal starting ability. In other words, the lower priority is set to the remaining devices in a state where the device in the mobility is adjusted in temperature. Therefore, this removes the remaining current of the fuel cell and shortens the time necessary for starting the mobility earlier. Conversely, if the control unit first operates the devices necessary for starting without heating coolant under the cold starting condition, there occurs a risky situation where the mobility is turned off again due to the low temperature states of the cooling devices operated at the same time as the operation of the mobility. Therefore, according to the present exemplary embodiment, it is possible to set the priority to the heating device or the cooling device that is the temperature adjustment device as the essential device for maintaining the operation state after the starting of the mobility, thereby making the operable state of the mobility more quickly and at the same time, to remove the remaining current of the fuel cell, thereby securing durability.

Meanwhile, according to another exemplary embodiment, the priority is reset depending upon whether the temperature sensor of the accessory is in the abnormal operation state or in the failure state. As the mobility is the transportation, stability should be given top priority in an out-of-control state. In particular, as the starting ability of the mobility provided with the fuel cell is accompanied by the generated water, the mobility should be sensitive to the out-of-control states of the temperature adjustment device and the measurement device thereof. Therefore, according to another exemplary embodiment, the priority is reset to the accessory irrelevant to the adjustment of the temperature in consideration of the out-of-control state of the temperature adjustment device more sensitively. Therefore, according to another exemplary embodiment, it is possible to remove and control the remaining current of the fuel cell, and to secure stability of the operation of the mobility at the same time.

FIG. 3 is a diagram according to the application of the fuel cell system of the mobility according to the exemplary embodiment of the present disclosure, in which the control unit may select the accessory whose consumable power is equal to or higher than the consumed power for consuming the remaining current of the fuel cell among the plurality of accessories. More specifically, in setting the current consumption priority of the selected accessories, the control unit may set the priority to the heating device or the cooling device through the outside temperature of the mobility or the temperature of the accessory among the selected accessories. On the other hand, in setting the current consumption priority of the selected accessories, the control unit may set the priority to the accessory depending upon whether each temperature sensor of the accessory among the selected accessories is in the abnormal operation state or in the failure state. In other words, according to the present exemplary embodiments, the priority is set to the accessory selected depending upon the consumable power of the accessory through the respective variables among the temperature condition.

FIG. 3 illustrates a control method of the control unit for setting the current consumption priority depending upon the temperature condition and the level of the consumable power of the accessory among a consumable accessory and a non-consumable accessory selected depending upon the level of the consumable power of the accessory. Here, the consumable accessory and the non-consumable accessory are accessories selected depending upon whether the level of the consumable power is equal to or higher than the consumed power or lower than the consumed power for consuming the remaining current of the fuel cell. Of course, the consumable accessory and the non-consumable accessory may be accessories selected depending upon whether the levels of the consumable powers are listed in order from a large level to a small level and then are equal to or higher than the first reference power or lower than the first reference power derived based on the consumed power for consuming the remaining current of the fuel cell. Here, the consumable power may be calculated as 0 if the accessory is in the failure state or in the abnormal operation state. The consumable power is calculated as 0 on the assumption that the corresponding accessory is controlled as being the error frame to be shutdown.

FIG. 3 illustrates that the priority is set depending upon the temperature condition among the selected consumable accessory and non-consumable accessory. Here, FIG. 3 illustrates the coolant pump of the fuel cell, the water heater as an example of the consumable accessory, and the radiator and the air compressor as an example of the non-consumable accessory. In other words, FIG. 3 illustrates the above components by assuming that the consumable powers of the accessories of the former are equal to or higher than the consumed power for consuming the remaining current of the fuel cell and the consumable powers of the accessories of the latter are lower than the consumed power.

Here, the priority is set to the coolant pump of the fuel cell and the water heater of the first and second left of FIG. 3 depending upon whether to satisfy the temperature condition. In the above method, as illustrated in FIG. 3, the control unit may arbitrarily select one of the consumable accessory or the non-consumable accessory to receive information about the temperature condition of the selected accessory to determine whether to satisfy the temperature condition and set the first priority to the accessory to immediately operate the accessory. Alternatively, unlike in FIG. 3, the control unit may receive information about the temperature conditions of all or some accessories belonging to the consumable accessory or the non-consumable accessory to set the accessory that best meets the temperature condition among the accessories that satisfy the temperature condition as the first priority to immediately operate the accessory. Of course, the control unit may receive the feedback about whether the remaining current of the fuel cell has been all removed even after the accessory set as the first priority is operated and then operate an accessory with the subsequent lower priority.

FIG. 3 illustrates, as an example of the temperature conditions, the outside temperature of the mobility or the temperature of the accessory, and whether the temperature sensor or the like is in the failure or abnormal operation state in determination symbols of the flowchart. Explaining the consumable accessory as an example, in FIG. 3, if the coolant temperature of the coolant pump of the fuel cell of the first left arbitrarily selected among the consumable accessories is equal to or higher than a certain temperature (first temperature), the control unit may set the priority of the coolant pump of the fuel cell as the first priority and operate the coolant pump of the fuel cell. However, if the coolant temperature is lower than the certain temperature, that is, if the operation of the coolant pump is not suitable for the vehicle state, the coolant pump of the fuel cell is set as the second priority or the subsequent lower priority and withheld. Further, the control unit may determine whether the temperature sensor of the water heater of the second left subsequently selected among the consumable accessories is in the failure or abnormal operation state, and if the water heater is not in the failure or abnormal operation state and operate the water heater, set the priority of the water heater as the first priority. If the remaining current of the fuel cell is all consumed after the operation of the water heater, the control unit may operate the fuel cell with a sequence signal that (re)starts the fuel cell.

Further, FIG. 3 illustrates that the selection of the accessory is switched into the non-consumable accessory with the arrow if the consumable accessory does not satisfy all of the temperature conditions. Such a switch is not necessarily limited to the temperature condition illustrated in FIG. 3, and includes cases where there is fluctuation of the consumable power due to the failure or abnormal operation state of the consumable accessary, the remaining current of the fuel cell remains even after the operation of the consumable accessory, and the like.

Further, like the consumable accessory, the non-consumable accessory will be described as an example. FIG. 3 illustrates that if the outside temperature of the mobility is equal to or higher than a certain temperature (second temperature) as the temperature condition in the radiator of the third left arbitrarily selected among the non-consumable accessories, the control unit sets the priority of the radiator as the first priority and operates the radiator. However, if the outside temperature of the mobility is lower than the certain temperature, in FIG. 3, the control unit determines whether the accessory is in the failure or abnormal operation state as the temperature condition by moving to the air compressor of the fourth left among the non-consumable accessories. If the air compressor is not in the failure or abnormal operation state, the control unit may set the priority of the air compressor as the first priority and operate the air compressor. If the air compressor is in the failure or abnormal operation state, the control unit may operate the remaining accessories not selected depending upon the temperature condition and the consumable power of the accessory. When the remaining current of the fuel cell is all consumed after the operation of the accessory to which the priority is set or the accessory not selected, the fuel cell system (FCU) controls the fuel cell with the sequence signal that (re)starts the fuel cell.

As described above, the control unit according to the exemplary embodiment of the present disclosure first selects the accessory whose consumable power is equal to or higher than the consumed power for consuming the remaining current of the fuel cell. This shut downs an unnecessary accessory by first excluding the accessory whose consumable power is lower than the consumed power of the remaining current. The conventional control method may randomly select and operate the accessory, and should measure the consumed power of the remaining current, which is consumed and left, again by first operating the accessory when the consumable power of the accessory is lower than the consumed power of the remaining current. Further, therefore, the conventional control method causes an unnecessary control by operating other accessories again. Further, the conventional control may cause the side effects on the mobility, such as operating the cooling device or the like when the mobility is in the cold starting condition upon operation of the accessory with the subsequent priority. Therefore, according to the exemplary embodiment of the present disclosure, it is possible to all consume the remaining current of the fuel cell through the one-time control, thereby increasing the promptness of the control. Further, according to the exemplary embodiment, it is possible to all consume the remaining current of the fuel cell and not to incorporate the operation control of other accessories, thereby blocking the adverse effects due to the operations thereof in advance.

As another exemplary embodiment of the present disclosure of FIG. 3, in setting the current consumption priority of the selected accessories, the control unit may set the priority to the heating device or the cooling device through the outside temperature of the mobility or the temperature of the accessory among the selected accessories. Therefore, according to the present exemplary embodiment, it is possible to set the priority to the temperature adjustment device among the consumable accessories, thereby securing the cold starting ability or the normal starting ability. Therefore, according to the present exemplary embodiment, it is possible to remove the remaining current of the fuel cell and at the same time, to shorten the time necessary for starting the mobility, thereby preventing performance deterioration and durability deterioration of the fuel cell.

As still another exemplary embodiment of the present disclosure, in setting the current consumption priority of the selected accessories, the control unit may set the priority to the accessory depending upon whether each temperature sensor of the accessory among the selected accessories is in the abnormal operation state or in the failure state. In other words, according to the present exemplary embodiment, the control unit sets the accessory that may not confirm the real situation of the temperature of each accessory like the failure state or abnormal operation state of each temperature sensor as the lower priority. Therefore, according to the present exemplary embodiment, it is possible to first select the accessory that certainly removes the remaining current of the fuel cell rather than an element that is burden to the starting of the mobility to remove the remaining current of the fuel cell, thereby securing starting ability of the mobility and stability of the control.

FIG. 3 is a diagram according to the application of the fuel cell system of the mobility according to the exemplary embodiment of the present disclosure, in which as another exemplary embodiment, the control unit may control the corresponding function to stop if the accessory to which the priority is set may perform the regenerative braking of the motor. In other words, according to the present exemplary embodiment, the control unit stops the regenerative braking function of the motor in advance.

The accessory to which the priority is set will be preferentially driven to remove the remaining current of the fuel cell. However, if there is an accessory capable of performing the regenerative braking of the motor among the accessories (e.g., the air compressor illustrated in FIG. 3), the regenerative braking function may be operated in a section where a rotation speed (RPM) of the air compressor is decreased. As a result, there occurs a risk of reviving the remaining current of the fuel cell. In particular, this may further deteriorate in a state where the remaining current of the fuel cell may not be consumed due to the shutdown of the power converter. Therefore, if such a situation is neglected, the conventional technology does not fundamentally achieve the object of the present disclosure, and repeats the same control again, thereby resulting in the time delay and a decrease in efficiency. Therefore, according to another exemplary embodiment of the present disclosure, the accessory capable of performing the regenerative braking of the motor stops the corresponding function, thereby increasing the promptness and efficiency of the control.

FIG. 3 illustrates the air compressor of the fourth left as the accessory capable of performing the regenerative braking of the motor. Such a control may be implemented by controlling the fuel cell system (FCU) to receive information about the RPM of the air compressor received from a blower pump control unit (BPCU) to stop the regenerative braking function of the motor before the RPM of the air compressor is decreased. In particular, when the converter is in a state of being shutdown by the control due to the error frame, the energy generated by the regenerative braking function of the motor may not be used for charging the battery even more, thereby worsening the overvoltage of the fuel cell. Therefore, in this case, according to the present exemplary embodiment, the control unit may continuously receive information about whether the RPM of the air compressor is decreased, that is, whether the air compressor satisfies the condition of performing the regenerative braking function to reset the priority to control the air compressor to stop, or to control the air compressor to stop in advance before starting.

FIG. 4 is a flowchart illustrating a method for controlling the fuel cell of the mobility according to the exemplary embodiment of the present disclosure. A method for controlling the fuel cell of the mobility according to the exemplary embodiment of the present disclosure, as the method for controlling the remaining current of the fuel cell to be consumed by the plurality of accessories, includes receiving, by a control unit, a temperature condition and a consumable power of an accessory (S100); selecting, by the control unit, an accessory that is a target to consume a remaining current among a plurality of accessories depending upon the received temperature condition and a level of the received consumable power of the accessory (S200, S302, S304); and setting, by the control unit, a current consumption priority of the selected accessories depending upon the received temperature condition and the level of the received consumable power of the accessory (S400, S502, S504).

More specifically, the method for controlling the fuel cell of the mobility according to the exemplary embodiment of the present disclosure first receives information about the temperature condition by the control unit (S100). At this time, to determine the temperature condition, the present step receives information about the temperatures of the fuel cell and the battery for driving the mobility, the temperature of the accessory from a plurality of accessories P1, P2, P3, P4 or from a temperature sensor or a humidity sensor installed outside the accessory or the outside temperature, or information about a change in humidity and whether a temperature-related device (e.g., measurement device, heating/cooling devices, or a warning device for warning the failure and abnormal operation state) is in a failure state or in an abnormal operation state). At the same time, the control unit in the present step inputs information about a consumable power of the accessory (S100). In this case, in the present step, the control unit inputs information about the maximum/average consumable powers at which the plurality of accessories connected to voltage terminals of the fuel cell side may be consumed and a sustainable time thereof, and a consumed power necessary for removing the remaining current of the fuel cell.

As a subsequent step, the control unit selects the accessory that is the target to consume the remaining current among the plurality of accessories depending upon the received temperature condition and the level of the received consumable power of the accessory (S200, S302, S304). In this step, as illustrated in FIG. 4, the control unit may determine whether the mobility is in a cold starting condition depending upon the temperature condition and the level of the consumable power of the accessory (S200). In this case, the cold starting condition is determined as a state where the mobility may start to operate under the temperature condition evaluated depending upon ① whether the outside temperature of a specific accessory or the mobility is lower than a certain level, ② whether the temperature condition is out of a range of an allowable temperature of the specific accessory or the mobility, ③ whether the level of condensation or cooling of moisture within devices constituting the mobility is out of a certain level or a certain scope, ④ whether the temperature measurement device, the battery and the fuel cell, the heating/cooling devices, and/or the warning device thereof are in the failure state or in the abnormal operation state, or others. Conversely, here, a normal starting condition of the mobility means a state where the mobility may start to operate in a state where the temperature condition is not in the cold state.

As a subsequent step, if the mobility satisfies the cold starting condition, the control unit selects the cold starting accessory that is the target to consume the remaining current among the plurality of accessories (S302). Otherwise, that is, if the mobility satisfies the normal starting condition, the control unit selects the normal starting accessory that is the target to consume the remaining current among the plurality of accessories (S304). Here, the cold starting accessory, as the accessory necessary for the mobility to start under the cold starting condition, includes the heating device of the fuel cell and the BOP of the fuel cell side or temperature measurement/control/warning devices thereof, or starting devices, such as a coolant circulation prevention device, an air compressor for purging, and a humidifier. Meanwhile, here, the normal starting accessory, as the accessory for the mobility to start under the normal starting condition of the mobility, includes a cooling device of the fuel cell and the BOP of the fuel cell side and an auxiliary device thereof, the temperature measurement/control/warning devices thereof, or the starting devices, such as the coolant circulation device, the air compressor for purging, a hydrogen recirculation blower, and the humidifier.

As a subsequent step, the control unit sets a current consumption priority of the selected accessories depending upon the received temperature condition and the level of the received consumable power of the accessory (S400, S502, S504). In this case, as illustrated in FIG. 4, the control unit may determine whether the consumable power of the corresponding accessory is equal to or higher than the consumed power for removing the remaining current of the fuel cell (S400). As a subsequent step, the control unit sets the current consumption priority of the cold starting accessory or the normal starting accessory that satisfies the above condition as the first priority (S502). The control unit sets the current consumption priority of the cold starting accessory or the normal starting accessory that does not satisfy the above condition as the second priority (S504).

Here, the consumable power of the accessory may be calculated as a value obtained by subtracting an output currently consumed by the corresponding accessory from the maximum consumable power (however, calculated as 0 in the failure state or the abnormal operation state) of the corresponding accessory. Further, the consumable/consumed "power" is a power at the current time (i.e., instantaneous power) or an average consumable power over time, or an ON power, and may be a concept including a duty or the like in the relationship with an Off section. However, if the control unit in the corresponding step may not find the accessory whose consumable power is equal to or higher than the consumed power for removing the remaining current of the fuel cell, the control unit may list the accessories in the order from the high consumable power of the accessory or determine whether to correspond to an accessory with the consumable power that is equal to or higher than a certain rate (50%) of the consumed power for removing the remaining current.

Subsequently, as a final step, the control unit operates the accessories depending upon the priority of the selected accessories (S600). In this case, the accessory to which the priority is set is preferentially driven to remove the remaining current of the fuel cell. Further, the present step may include measuring and determining whether the remaining current of the fuel cell has been removed. A subsequent step may include terminating the corresponding control if the remaining current of the fuel cell has been removed, and returning to the beginning of the corresponding control if the remaining current of the fuel cell has not been removed. Further, the present step may include controlling an accessory capable of performing the regenerative braking of the motor to stop the function.

The method for controlling the fuel cell of the mobility according to the exemplary embodiment of the present disclosure solves the problem, which is caused by selecting and driving any one accessory or several accessories, by selecting the accessory to consume the remaining current depending upon the temperature condition and the level of the consumable power of the accessory. In other words, according to the exemplary embodiment of the present disclosure, it is possible to control the selection of the accessory depending upon the state of the mobility, thereby removing the remaining current of the fuel cell and at the same time, implementing the state of the mobility capable of entering the (re)start mode and maintaining the operation. As a result, this increases stability of the fuel cell control.

Furthermore, the method for controlling the fuel cell of the mobility according to the exemplary embodiment of the present disclosure sets the current consumption priority of the selected accessories. This does not just select the appropriate accessories, but rather completes the goal of consuming the remaining current of the fuel cell. In other words, the control unit according to the present exemplary embodiment controls the accessory with the same priority or the subsequent lower priority to all consume the remaining current of the fuel cell if the remaining current of the fuel cell is not all consumed even after the accessory with the first priority is driven.

At the same time, the method for controlling the fuel cell of the mobility according to the exemplary embodiment of the present disclosure may set the criteria of setting the priority of the accessory depending upon the current consumption, and therefore, control it to set the priority to a device for removing an element interfering with the current consumption. For example, if the accessory performs the regenerative braking function of the motor when the rotation speed (RPM) of the accessory is decreased among the accessories (hereinafter, the accessory with the higher priority is referred to as P1 and the accessory with the lower priority is referred to as P2), the remaining current of the fuel cell consumed by the operation of the accessory P2 may be revived by the regenerative braking function. In this case, it is possible to set the priority to the accessory P1 that controls such a situation, thereby blocking the element interfering with the consumption of the remaining current.

Therefore, the method for controlling the fuel cell of the mobility according to the exemplary embodiment of the present disclosure selects the accessory depending upon the temperature condition and the level of the consumable power of the accessory and at the same time, sets the current consumption priority, thereby consuming the remaining current of the fuel cell without failure or abnormality of the fuel cell system. Therefore, the control method according to the present exemplary embodiment prevents performance and durability deteriorations of all devices including the accessory and the battery constituting the mobility due to the erroneous starting or the like as well as preventing performance and durability deteriorations of the fuel cell, and increases stability of the control thereof.

FIG. 4 is a flowchart illustrating the method for controlling the fuel cell of the mobility according to the exemplary embodiment of the present disclosure, and specifically, the selecting of the accessory may select the cold starting accessory if the mobility satisfies the cold starting condition among the plurality of accessories and select the normal starting accessory if the mobility satisfies the normal starting condition (S302, S304). This simultaneously secures the removal of the remaining current of the fuel cell and the cold starting ability of the mobility provided with the fuel cell. If the temperature of the coolant of the fuel cell side is rapidly decreased, the mobility may not even start later even if the remaining current of the fuel cell is removed unless the temperature is increased by the accessory in advance before starting. Further, if the mobility is erroneously driven, there occurs a risky phenomenon in which the remaining water due to the reaction of the fuel cell is frozen, thereby clogging the pipe. Therefore, the method for controlling the fuel cell of the mobility according to the exemplary embodiment of the present disclosure controls to operate or shutdown the accessory necessary for the cold starting before starting in advance if the mobility is in the cold starting condition such that the remaining current of the fuel cell may be removed and the mobility may be restarted by the accessory in an intact state.

FIG. 4 is a flowchart illustrating the method for controlling the fuel cell of the mobility according to the exemplary embodiment of the present disclosure, and more specifically, the selecting of the accessory may select the accessory whose consumable power is equal to or higher than the consumed power for consuming the remaining current of the fuel cell among the plurality of accessories (S302, S304). This shut downs the unnecessary accessory by first excluding the accessory with the consumable power lower than the consumed power of the remaining current. The conventional control method may randomly select and operate the accessory, and should measure the consumed power of the remaining current, which is consumed and left, again by first operating the accessory when the consumable power of the accessory is lower than the consumed power of the remaining current. Further, therefore, the conventional control method causes the unnecessary control by operating other accessories again. Further, the conventional control may cause the side effects (such as operating the cooling device in the cold starting condition) on the mobility upon operation of the subsequent accessory. Therefore, the method for controlling the fuel cell of the mobility according to the exemplary embodiment of the present disclosure all consumes the remaining current of the fuel cell through the one-time control, thereby increasing the promptness of the control. Further, the control method according to the exemplary embodiment all consumes the remaining current of the fuel cell and does not incorporate the operation control of other accessories, thereby blocking the adverse effects due to the operations thereof in advance.

FIG. 4 is a flowchart illustrating the method for controlling the fuel cell of the mobility according to the exemplary embodiment of the present disclosure, and more specifically, the setting of the current consumption priority of the accessories may control the function to stop if the accessory to which the priority is set may perform the regenerative braking of the motor (S600).

According to the method for controlling the fuel cell according to the present exemplary embodiment, the accessory to which the priority is set will be preferentially driven to remove the remaining current of the fuel cell. However, like the air compressor illustrated in FIG. 3, if the accessory may perform the regenerative braking of the motor among the accessories, the regenerative braking function may be operated in the section where the rotation speed (RPM) of the accessory is decreased. As a result, there occurs a risk of reviving the remaining current of the fuel cell. In particular, this will be further worsened in a state where the remaining current of the fuel cell may not be consumed because the power converter is shut down. Therefore, when such a situation is neglected, the conventional technology does not fundamentally achieve the object of the present disclosure, and repeats the same control again, thereby causing the time delay and the decrease in efficiency. Therefore, according to the method for controlling the fuel cell according to another exemplary embodiment of the present disclosure, the control unit controls the accessory capable of performing the regenerative braking of the motor to stop the corresponding function, thereby increasing the promptness and efficiency of the control.

The present disclosure relates to the fuel cell system of the mobility and the method for controlling the same, and more specifically, to the fuel cell system of the mobility and the method for controlling the same, which control the remaining current of the fuel cell, which does not flow into the battery after the fuel cell is shut down or before it is restarted, to be consumed by the plurality of accessories, thereby preventing performance deterioration and durability deterioration of the fuel cell due to the overcurrent, and set the selection and priority of the accessories depending upon the state of the mobility previously driven, thereby blocking the side effects due to the pre-operation of the accessory.

The mobility configured to generate the driving outputs through the fuel cell and the battery may be provided with the high-voltage battery, and therefore, provided with the high-voltage power converter (e.g., the bi-direction high-voltage DC-DC converter (BHDC) or the fuel cell DC-DC converter (FDC)) to match the levels between the high-voltage battery and the voltage terminals of the fuel cell side. However, the high-voltage power converter is shut down for protecting high-voltage components due to the property of the component if there occurs the error frame. The stopped high-voltage power converter reoperates only through the restarting sequence after key-off. In particular, if there occurs the error frame in the high-voltage power converter while the hydrogen electric vehicle is operated, the high-voltage power converter is shut down and enters the shutdown sequence. At this time, if the fine current flows outside, the high potential is formed, and at the same time, the fine current may not flow into the high-voltage battery terminal due to the non-operation of the high-voltage power converter according to the occurrence of the error frame.

This may increase the levels of the voltage terminals of the fuel cell system, and cause cumulative damage to the fuel cell system.

Therefore, the fuel cell system of the mobility and the method for controlling the same according to the exemplary embodiment of the present disclosure are the software solution method for automatically consuming the fine current in advance. In other words, according to the exemplary embodiment of the present disclosure, it is possible to automatically control the selection of the accessory depending upon the state of the mobility, thereby removing the remaining current of the fuel cell and at the same time, implementing the state of the mobility capable of entering the (re)starting mode or maintaining the operation. As a result, this increases stability of the fuel cell control. Furthermore, the exemplary embodiment of the present disclosure does not just select the appropriate accessories, but rather completes the goal of consuming the remaining current of the fuel cell. Therefore, according to the exemplary embodiment of the present disclosure, it is possible to select the accessory depending upon the temperature condition and the level of the consumable power of the accessory and at the same time, to set the current consumption priority, thereby preventing the performance and durability deteriorations of the fuel cell, and preventing performance and durability deteriorations of all devices including the accessory and the battery constituting the mobility due to the erroneous starting or the like.

While the specific exemplary embodiment of the present disclosure has been illustrated and described, it will be apparent to those skilled in the art that the present disclosure may be variously improved and changed without departing from the technical spirit of the present disclosure provided by the appended claims.

What is claimed is:

1. A fuel cell system of a mobility comprising:
a control unit configured to control a remaining current of a fuel cell to be consumed by a plurality of accessories, to select at least one accessory that is a target to consume the remaining current among the plurality of accessories depending upon a temperature condition, and to set a current consumption priority of the selected accessories based on a level of a consumable power of the selected accessories,
wherein the control unit controls the remaining current of the fuel cell to be consumed by operation of the accessories in order of priority, starting with a highest priority, until the remaining current of the fuel cell is consumed,
wherein the temperature condition includes a cold starting condition and a normal starting condition,
wherein the consumable power of the accessory is determined by subtracting an output currently consumed by the accessory from a maximum consumable power of the accessory,
wherein the control unit selects the target to consume the remaining current based on whether the temperature condition is the cold starting condition or the normal starting condition, and
wherein the control unit sets a priority to an accessory whose consumable power is equal to or higher than a consumed current for consuming the remaining current of the fuel cell among the selected accessories.

2. The fuel cell system of the mobility according to claim 1,
wherein the control unit selects a cold starting accessory to consume the remaining current among the plurality of accessories if a mobility satisfies the cold starting condition, and selects a normal starting accessory if the mobility satisfies the normal starting condition.

3. The fuel cell system of the mobility according to claim 2,
wherein the control unit determines the cold starting condition or the normal starting condition through an outside temperature of the mobility or a temperature of the accessory.

4. The fuel cell system of the mobility according to claim 2,
wherein the control unit determines the cold starting condition or the normal starting condition depending upon whether each temperature sensor of the cold starting accessory or the normal starting accessory is in an abnormal operation state or in a failure state.

5. The fuel cell system of the mobility according to claim 2,
wherein the control unit sets a priority to a heating device among the selected accessories when selecting the cold starting accessory, and sets the priority to a cooling device among the selected accessories when selecting the normal starting accessory.

6. The fuel cell system of the mobility according to claim 5,
wherein the control unit sets the priority to an accessory with a subsequent lower priority if a temperature sensor of the accessory to which the priority is set is in an abnormal operation state or in a failure state.

7. The fuel cell system of the mobility according to claim 1,
wherein the control unit selects an accessory whose consumable power is equal to or higher than a consumed power for the remaining current of the fuel cell among the plurality of accessories.

8. The fuel cell system of the mobility according to claim 7,
wherein in setting the current consumption priority of the selected accessories, the control unit sets the priority to a heating device or a cooling device through an outside temperature of the mobility or a temperature of the accessory among the selected accessories.

9. The fuel cell system of the mobility according to claim 7,
wherein in setting the current consumption priority of the selected accessories, the control unit sets the priority to the accessory depending upon whether each temperature sensor of the accessory among the selected accessories is in an abnormal operation state or in a failure state.

10. The fuel cell system of the mobility according to claim 1,
wherein the control unit controls the function to stop if the accessory to which the priority is set performs a regenerative braking of a motor.

* * * * *